Patented June 23, 1925.

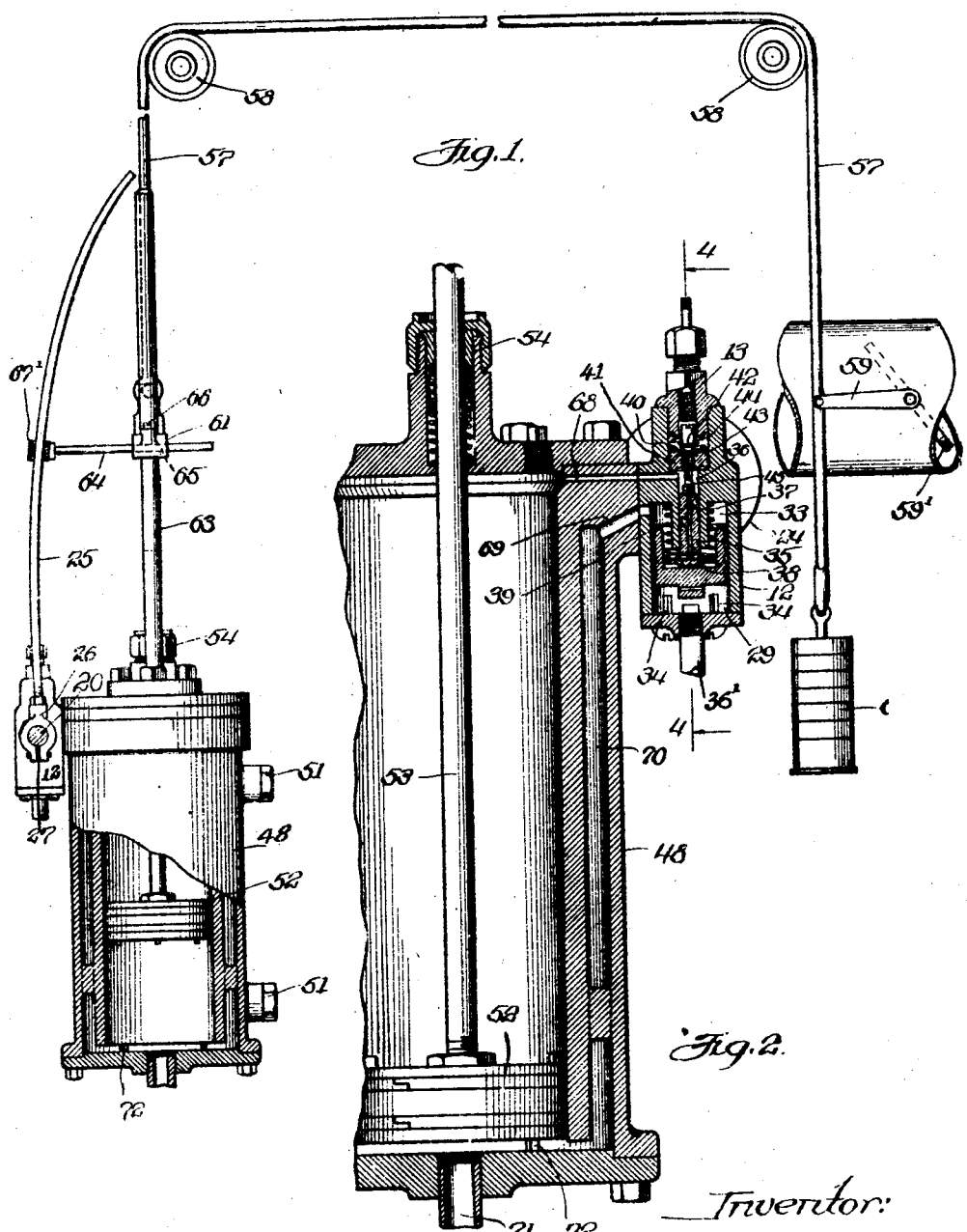

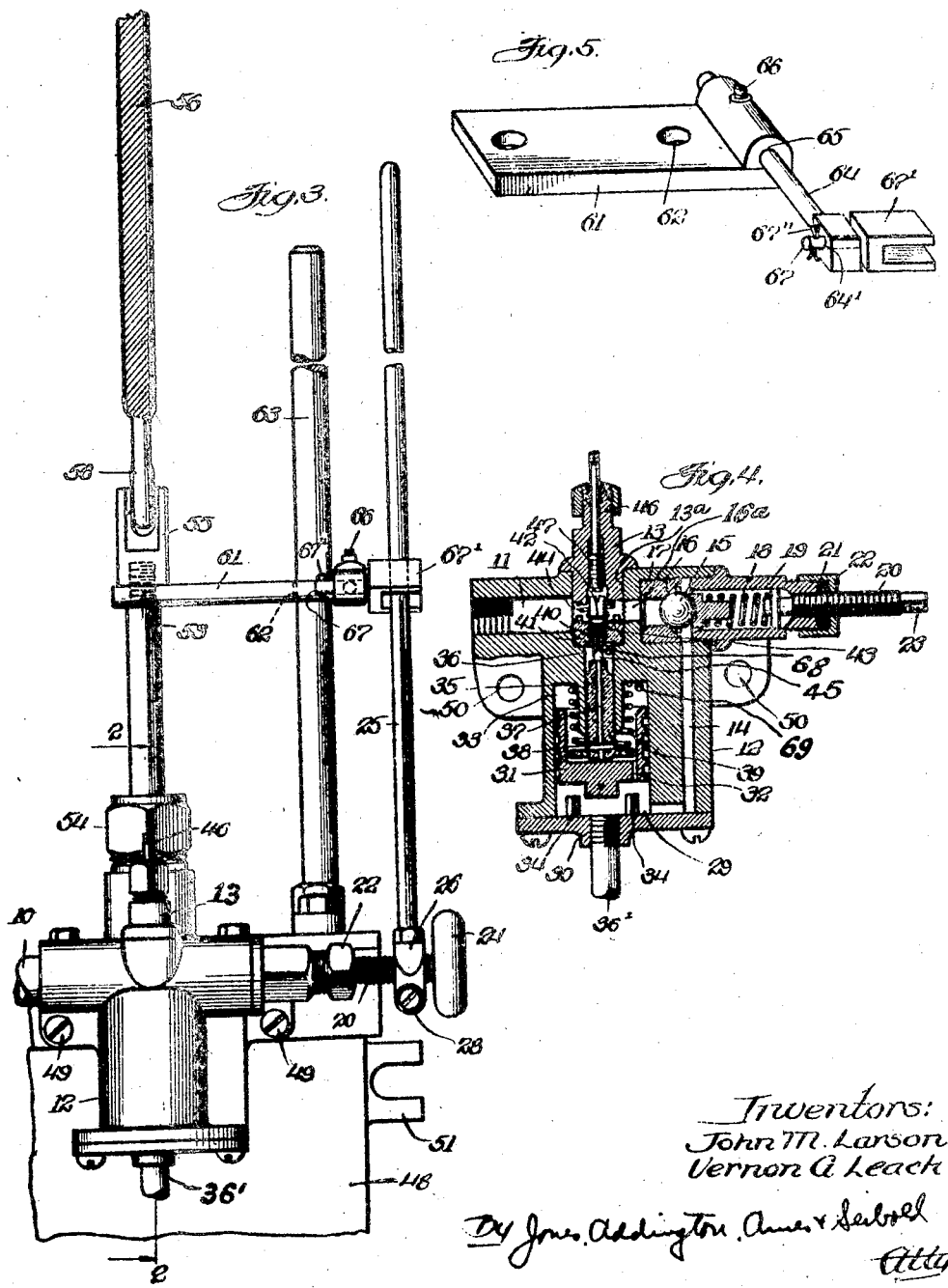

1,543,445

UNITED STATES PATENT OFFICE.

JOHN M. LARSON AND VERNON G. LEACH, OF CHICAGO, ILLINOIS, ASSIGNORS TO NATIONAL REGULATOR COMPANY, OF CHICAGO, ILLINOIS, A CORPORATION OF ILLINOIS.

REGULATOR FOR HIGH-PRESSURE SYSTEMS.

Application filed September 12, 1921. Serial No. 499,931.

*To all whom it may concern:*

Be it known that we, JOHN M. LARSON and VERNON G. LEACH, citizens of the United States, both residing at Chicago, in the county of Cook and State of Illinois, have invented certain new and useful Improvements in Regulators for High-Pressure Systems, of which the following is a full, clear, concise, and exact description, reference being had to the accompanying drawings, forming a part of this specification.

Our invention relates to improvements in pressure regulators for high pressure systems, and has for its object the production of a device of this character which will be automatically and gradually adjustable so as to adapt the same for regulation over a wide range of pressure variation, as wide for instance, as fifteen pounds, the same in this respect being an improvement of the regulator shown in United States patent to John M. Larson, No. 1,376,948, dated May 3, 1921.

A further object is the production of a regulator which may be readily adjusted so as to vary the range of pressure variation at which the regulator will operate.

A still further object is the production of a regulator, as mentioned, which will be of durable and economical construction and highly efficient in use.

Other objects will appear hereinafter.

With these objects in view the invention consists in the combinations and arrangements of parts hereinafter described and claimed.

The invention will be best understood by reference to the accompanying drawings in which like characters of reference in the various views refer to corresponding parts.

In the drawings—

Fig. 1 is a side elevation, partly in section, of a device embodying the invention, the same being shown operatively connected with a damper of a high pressure system or plant;

Fig. 2 is an enlarged section taken on substantially line 2—2 of Fig. 3;

Fig. 3 is a front elevation of the upper portion of the regulator;

Fig. 4 is a slightly enlarged section taken on substantially line 4—4 of Fig. 2; and Fig. 5 is a perspective view of the means employed for connecting the piston rod of the device with the spring tension adjusting arm employed in the construction.

The preferred form of construction, as illustrated in the drawings, is designed for use in connection with a high pressure system or plant, the regulation in the system or plant being acccomplished through automatic adjustment of the damper which controls the draught of the fire box or heating element of the system or plant.

In the drawings, 10 represents a pipe from a source of steam pressure, such, for instance, as the boiler of the system or plant in connection with which the device is used. The pipe 10 communicates with a chamber 11 in the main valve casting 12, said main valve being of much the same construction as that shown in said U. S. Patent No. 1,376,948 above referred to. The chamber 11 extends below a plug 13, threaded in the upper end of a passage 13ª also formed in said casting. Communication between chamber 11 and passage 14 is controlled by a ball check valve 15, which is adapted to seat on a valve seat 16 formed in an annular member 17 threaded in the casting 12, adjacent an opening 16ª communicating with the chamber 11.

Co-operating with the valve 15 is a helical compression spring 18 arranged in a housing 19 threaded into one side of casting 12. Threaded into the outer end of housing 19 is a stem 20, suitable packing 21 being provided which is held in position by a screw cap 22 to prevent leakage around said stem. The inner end of stem 20 engages against the adjacent end of spring 18, the arrangement being such, as will be seen, that the pressure exerted by said spring upon the valve 15 may be varied by rotatable adjustment of said stem. Said stem is provided with a squared outer end 23 on which a hand wheel 24 is provided whereby said stem may be manually adjustetd if desired.

Automatic adjustment of said stem is effected through the medium of an elongated curved arm 25, one end of which is attached to a clamp 26 adapted to engage with the protruding end of said stem. Said clamp is threaded on to said stem, and one side thereof is slit or bifurcated as at 27, the divided portions being connected by a screw 28 whereby the same may be drawn together in order to clampingly engage the stem, as will be readily understood.

The clamping engagement of the arm 25 with the stem 20 is such that in the rocking or rotary movement of said arm said stem will be correspondingly moved. At the same time, the arrangement is such, that said stem may be manually adjusted through engagement with the hand wheel 24 independently of said arm inasmuch as the frictional engagement of said arm with said stem is such that the same may be readily overcome by manual force applied to the hand wheel.

The passage 14 communicates with a chamber 29 provided in the main valve casting 12. A threaded opening 30 leads from the underside of said chamber for connection with a pipe 36' adapted to connect with a pressure gauge. Above this chamber 29 is a vertically movable plunger 31, said plunger being provided with a small passage or bleed 32 which establishes communication between the chamber 29 and a chamber 33 formed above said plunger. Lugs 34 arranged in the chamber 29 are provided to limit downward movement of plunger 31.

Slidably mounted in casting 12 axially above the plunger 31 is a plunger 35 above the upper end of which is formed a chamber 36. Communication between chambers 33 and 36 may be established through an axial passage 37 formed in the plunger 35 and branch passages 38 leading from the lower end of said axial passage, as clearly seen in Fig. 4.

The plunger 35 is normally held at its lower terminal of movement, that is, in a position in which the same engages against the upper side of plunger 31, by means of a helical compression spring 39, the lower end of said plunger being enlarged for engagement with said spring.

Communication between the chambers 11 and 36 may be established through a passage 40 formed in an annular member 41 threaded into casting 12. Said passage 40 is controlled by a check valve 42 which is normally held in closed position, that is, engaging against its valve seat 43 by means of a compression spring 44. Said valve 42 is provided with a depending stem 45 which passes through the passage 40 for engagement with the upper end of plunger 35. The arrangement is such that valve 42 will be open only upon upward movement of plunger 35 into engagement with stem 45, and when said stem 45 is in engagement with said plunger, the lower end of said stem will close the upper end of passage 37 and thus cut off communication between chambers 33 and 36.

Upward movement of valve 42 is limited by a stem 46, the lower end portion 47 of which is threaded into plug 13, as clearly seen in Fig. 4. The exteriorly projecting end of said stem is suitably packed to prevent leakage around the same.

The main valve casting 12 is mounted upon one side of a cylinder 48, the same being secured thereto by screws 49, said casting being provided with suitable openings 50 to accommodate said screws. The rear side of cylinder 48 is provided with slotted lugs 51 for mounting of the same upon a suitable support.

Operating in the cylinder 48 is a piston 52 carried by a piston rod 53 which projects exteriorly through the upper end or head of said cylinder, a suitable packing 54 surrounding said stem to prevent leakage. The upper end of said rod is provided with an eye 55 for engagement by a connecting element 56 provided at one end of a cable, chain or other suitable flexible connector 57. The member 57 passes around suitable pulleys 58 for connection with the actuating arm 59 of the damper 59' to be controlled. A counter weight 60 cooperates with the actuating arm 59' to rock the same downwardly. The arrangement is such, as will be seen, that said damper actuating arm will be rocked in the opposite direction through downward movement of piston 52 in cylinder 48.

Carried by the outer end of the piston rod 53 is a cross piece 61, the same being rigidly secured thereto by means of the end piece 55, as clearly seen in Fig. 3. The cross piece 61 is provided at its outer end with an opening 62 which slidably engages with a guide rod 63 secured at its lower end to the cylinder 48, said guide rod being arranged parallel with the piston rod 53 and serving to guide said cross piece 61 during reciprocatory movement of said piston rod. Carried at the outer end of cross piece 61 is a bar 64 which engages a transversely extending opening 65 in said cross piece, said bar being slidably adjustable therein and being locked in positions of adjustment by a set screw 66, as clearly seen in Fig. 5.

In the outer enlarged end of member 64 is formed a transversely extending opening 64' in which is loosely or pivotally mounted the stem 67 of a fork 67', a cotter pin 67" serving to lock the stem 67 against longitudinal movement, as will be seen.

The fork 67' slidably engages or embraces the arm 25, the inner surfaces of the branches of said fork being convex, as clearly seen in Fig. 1, so as to insure against binding of the parts during vertical movement of said fork. The arrangement is such, as will be seen, that in the vertical movement of the piston 52, the fork 67' will be correspondingly moved with the result that the arm 25 will be oscillated, thus effecting corresponding movement of the stem or screw 20 thereby increasing or decreasing the tension of spring 18 depending upon the direction in which said stem or screw is rotated.

With this arrangement, when the piston 52 moves downwardly in the cylinder 48, the arm 25 will be rocked in a direction causing the screw 25 to be positively rotated, thereby increasing the tension of the spring 18 and hence the pressure exerted thereby on the valve 15. When the piston 52' moves upwardly the reverse will be true. The curvature of rod 25 is such that in the vertical movement of the actuating fork 67', the oscillating movement of said arm will be uniform, that is, said arm will not be rotated faster as the fork approaches the fulcrum of said arm, the curvature of said arm being such as to compensate for the variation in speed of oscillation of the arm as would otherwise result were said arm straight instead of curved.

The chamber 36 of the main valve housing 12 is connected by a passage 68 with the cylinder 48 above the piston 52. The chamber 33 of said main valve housing is connected by means of a passage 69 with an encircling passage or space 70 formed in the walls of cylinder 48, the lower end of said passage or space 70 communicating with an exhaust pipe 71. Lugs 72 are provided at the lower end of piston 52 to limit downward movement thereof.

In the operation of the device, steam under pressure from the boiler in connection with which the device is used, may enter the chamber 11 from the pipe 10. We will say the device is adjusted to maintain a pressure of 150 pounds. In this case the stem 20 would be adjusted so that the valve 15 would open when a pressure of 144 pounds was reached. The spring 39 would be comparatively light preventing raising of plunger 31 until a pressure of six pounds had accumulated below the same. With this arrangement, as soon as the valve 15 was opened by a pressure of 144 pounds, steam would flow past it into chamber 29 whence the same would pass through the bleed passage 32 and passage 69 into the chamber 70 through which it would circulate before being exhausted through exhaust pipe 71. The steam thus circulated through said chamber would serve to heat the cylinder. This heating of the cylinder precedes the operation of the plunger 31 which will not take place until a pressure of six pounds has been built up behind or below it. When said six pounds pressure has been built up, said plunger will be moved upwardly which, in turn, will cause the plunger 35 to be moved upwardly against the influence of spring 39. The upper end of plunger 35 will contact with the stem 45 of valve 42 and cause the latter to be lifted from its seat. The steam under pressure in chamber 11 will then flow past the valve 42 and through the passage 40 into the chamber 36. The upper end of passage 37 being closed by the lower end of stem 45, the steam under pressure in said chamber 36 will then flow through the passage 68 into the upper end of cylinder 48 causing the piston 52 to be moved downwardly. The preheating of the cylinder 48, as before described, which takes place at a considerable period before the high pressure is admitted above piston 52, prevents condensation of the high pressure steam which would otherwise occur if the cylinder were not preheated. This, of course, results in a much more prompt action than if the operation had to wait until the cylinder warmed up.

Downward movement of said piston will have the effect of tilting the damper toward closing position in order to quench the fire and hence to decrease the pressure in the boiler. At the same time said downward movement of piston 52 will have the effect of rocking the arm 25 in a positive or clockwise direction thus automatically increasing the tension of the spring 18 and hence the pressure exerted on the valve 15. The pressure of spring 18 upon valve 15 will be automatically and gradually increased as the piston 52 moves downwardly under any increasing pressure in the boiler, with the result that a very sensitive regulation is secured and yet one which will automatically vary to accommodate a wide range of pressure variation in the boiler.

As the pressure in the boiler decreases by reason of closing of the damper, as just described, the pressure in the chamber 11 will in time fall below the pressure exerted by the spring 18 and upon valve 15, when said valve will be moved to closing position under the influence of said spring. When this takes place, communication between the chamber 11 and passage 14 will be shut off. Any steam or fluid in passage 14 and chamber 29 will gradually pass through the restricted opening or bleed 32 in plunger 31 and enter chamber 33. In this event, the pressure of spring 39 aided by the pressure of the steam in chamber 36 will cause plunger 35 and hence the plunger 31 to move downwardly. When this takes place, the valve 42 will first be permitted to move to closing position under the influence of spring 44 and, when plunger 35 has moved downwardly to a sufficient extent, the upper end of the same will move away from the lower end of stem 45 thus uncovering the upper end of passage 37 in said plunger. When this takes place, it will be seen that the steam under pressure in the upper end of cylinder 48 will be permitted to flow through the passage 68 into chamber 36, whence the same will flow through the passage 37 and branch passages 38 into chamber 33 and thence through passages 69 and 70 into exhaust pipe 71. The pressure above piston 52 is thus released allowing the latter to move upwardly under the influence of counter weight 60. As said counter weight moves downwardly, the damper will be moved to open position, as will be readily understood. In this movement of the piston, the arm 25 will be caused by the fork 67' to move in a negative or counterclockwise direction with the result that the tension of spring 18 and hence the pressure exerted thereby on valve 15 will be decreased.

Automatic control of the pressure of the plant or system in connection with which the device is used is thus secured and in such manner that control of the pressure will be extended over a considerable range. The extent of this range may be varied so that the device will be effective within limits up to say fifteen pounds variation in the boiler through adjustment of the bar or stem 64 carrying the fork 67' in the cross piece 61. By sliding said member 64 in one direction, the amplitude of oscillation of the arm 25 during oscillation of the piston 52 will be increased whereas shifting of said member 64 in the opposite direction will cause the amplitude of oscillation of said arm to be decreased. The smaller the amplitude of oscillation of said arm with respect to the movement of the piston, the smaller will be the variation in the tension of the spring 18 with respect to the movement of the piston and hence the smaller will be the range of pressure variation over which the regulator will be operative; the greater the amplitude of oscillation of said arm, the greater will be the variation in the tension of said spring with respect to the movement of the piston and hence the wider will be the range of pressure variation over which the regulator will be operative.

It has been found in practice that this form of regulator is especially applicable in connection with high pressure plants using stokers and forced or induced draught fans where the boiler pressure is suddenly reduced or increased and to a considerable extent.

While we have illustrated and described the preferred form of construction as embodying our invention, it is apparent that this is capable of variation and modification without departing from the spirit of the invention. We therefore do not wish to limit ourselves to the precise form of construction shown.

Having described our invention, what we claim as new and desire to secure by Letters Patent is:

1. In a regulator, the combination with a cylinder; a piston operating therein; and a source of fluid pressure, of means for utilizing said pressure to regulate the movement of said piston, said means comprising a valve adjustable to open at a predetermined fluid pressure; and actuating means utilizing the movement of said piston to vary the adjustment of said valve, said actuating means comprising an oscillatory arm; and reciprocatory means operatively connected with said piston and slidably engaging said arm for oscillating the same, said reciprocatory means being adjustable for varying the amplitude of oscillation of said arm with respect to the movement of said piston.

2. In a regulator, the combination with a cylinder; a piston operating therein; and a source of fluid pressure, of means for utilizing said pressure to regulate the movement of said piston, said means comprising a check-valve; actuating means utilizing the movement of said piston to vary the adjustment of said valve, said actuating means comprising an oscillatory arm operatively connected to said valve; a cross piece movable with said piston; and a fork on said cross piece engaging said arm to oscillate the same upon movement of said piston, said fork being adjustable to vary the amplitude of oscillation of said arm with respect to the movement of said piston.

3. In a regulator, the combination with a cylinder; a piston operating therein; and a source of fluid pressure, of means for utilizing said pressure to regulate the movement of said piston, said means comprising a check-valve; actuating means utilizing the movement of said piston to vary the adjustment of said valve, said actuating means comprising a curved oscillatory arm operatively connected to said valve, a reciprocatory element operatively connected with said piston and slidably engaging said arm for oscillating the same, said arm being so curved that during movement of said element the extent of the oscillation of said arm will be substantially directly proportional to the movement of said piston.

4. In a pressure regulating system, a check-valve subjected to the pressure, said valve being adjustable to open upon the occurrence of pressures above a predetermined value, pressure controlling means comprising a reciprocating piston effective upon the opening of said valve to provide a graduated pressure control, actuating means utilizing the movement of said piston to vary the adjustment of said valve, said actuating means comprising a curved oscillatory arm operatively connected to said valve, a reciprocatory element operatively connected with said piston and slidably engaging said arm for oscillating the same, said arm being so curved that during movement of said element the extent of the oscillation of said arm will be substantially directly proportional to the movement of said piston.

5. In a varying pressure fluid system, means effective for providing a graduated control of the pressure upon the occurrence of a predetermined actuating pressure during periods of rising pressure, and mechanism operated by said means, which mechanism effects graduated temporary adjustments of said means substantially proportional to the extent of said graduated control whereby during the succeeding periods of falling pressure said means is rendered ineffective at pressures proportionately higher than said predetermined pressure.

6. In a pressure regulating system, a check-valve subjected to the pressure, said valve being adjustable to open upon the occurrence of pressures above a predetermined value, pressure controlling means effective upon the opening of said valve to provide a graduated pressure control, and mechanism operatively connecting said means to said valve whereby said valve is given a graduated adjustment substantially directly proportional to the extent of said graduated pressure control and whereby said valve will close at pressures proportionately higher than said predetermined value.

7. In a regulator, the combination with a cylinder; a piston operating therein and a source of hot fluid under pressure, of means for utilizing said pressure to regulate the movement of said piston, said means comprising a valve; and means for utilizing fluid exhausted from said valve to heat the side walls of said cylinder prior to each operation of said piston.

8. In a regulator, the combination of an elongated cylinder having an encircling chamber in the walls thereof extending substantially the full length of said cylinder; a piston operating in said cylinder; a source of hot fluid under pressure; means for utilizing said pressure to regulate the movement of said piston; and means for circulating some of said hot fluid through said chamber prior to operation of said piston.

9. In a regulator, the combination of a cylinder having an encircling chamber in the walls thereof; a piston operating in said cylinder; a source of hot fluid under pressure; means for utilizing said pressure to regulate the movement of said piston, said means comprising a valve; and means for allowing a limited amount of fluid to pass through said valve and into said chamber prior to operation of said piston.

10. In a regulator, a cylinder, a piston operating therein and a source of hot fluid under pressure, a warming jacket for said cylinder, means for utilizing said pressure to regulate the movement of said piston, said means being provided with a valve and exhaust vent operable automatically to admit hot fluid to said warming jacket prior to each actuation of the regulator.

In witness whereof, we have hereunto subscribed our names.

JOHN M. LARSON.
VERNON G. LEACH.